(12) United States Patent
MacHarg

(10) Patent No.: US 8,419,940 B2
(45) Date of Patent: *Apr. 16, 2013

(54) COMBINED AXIAL PISTON LIQUID PUMP AND ENERGY RECOVERY PRESSURE EXCHANGER

(75) Inventor: John P. MacHarg, Ventura, CA (US)

(73) Assignee: Ocean Pacific Technologies, Ventura, CA (US)

( * ) Notice: Subject to any disclaimer, the term of this patent is extended or adjusted under 35 U.S.C. 154(b) by 82 days.

This patent is subject to a terminal disclaimer.

(21) Appl. No.: 12/887,305

(22) Filed: Sep. 21, 2010

(65) Prior Publication Data

US 2011/0006006 A1    Jan. 13, 2011

Related U.S. Application Data

(63) Continuation of application No. 12/008,772, filed on Jan. 15, 2008, now Pat. No. 7,799,221.

(51) Int. Cl.
*B01D 61/06* (2006.01)
*B01D 61/08* (2006.01)
*B01D 63/00* (2006.01)

(52) U.S. Cl.
USPC ...... 210/321.66; 210/652; 417/269; 417/273; 417/272; 417/222.1

(58) Field of Classification Search .................. None
See application file for complete search history.

(56) References Cited

U.S. PATENT DOCUMENTS

| | | | |
|---|---|---|---|
| 2,733,666 A | 2/1956 | Poulos | |
| 3,293,881 A | 12/1966 | Walker | |
| 3,431,747 A | 3/1969 | Hashemi et al. | |
| 3,612,725 A | 10/1971 | Spence | |
| 3,808,949 A | 5/1974 | Muncke et al. | |
| 4,637,783 A | 1/1987 | Andeen | |
| 4,887,942 A | 12/1989 | Hauge | |
| 5,306,428 A | 4/1994 | Tonner | |
| 5,462,414 A | 10/1995 | Permar | |
| 5,778,757 A | 7/1998 | Kristensen | |
| 6,000,316 A | 12/1999 | Møller et al. | |
| 6,017,200 A | 1/2000 | Childs | |
| 6,659,731 B1 | 12/2003 | Hauge | |
| 6,804,962 B1 | 10/2004 | Prueitt | |
| 6,998,053 B2 | 2/2006 | Awerbuch | |
| 2005/0166978 A1 | 8/2005 | Brueckmann et al. | |
| 2005/0220643 A1 | 10/2005 | Honma | |
| 2007/0128056 A1 | 6/2007 | Haudenschild | |

FOREIGN PATENT DOCUMENTS

| | | |
|---|---|---|
| EP | 1508361 A1 | 2/2005 |
| EP | 1508361 B1 | 2/2009 |
| ZA | 92090078 | 7/1993 |

*Primary Examiner* — Krishnan S Menon

(57) ABSTRACT

A pumping machine, that can serve a system as the sole main pump for pressurizing a primary liquid flow, incorporates, in a single machine, a rotor-drum type AP (axial piston) pump and a PX (pressure exchanger) that recovers energy from a secondary liquid flow such as the brine discharge from an RO seawater desalination system, with benefits including fewer moving parts and small machine size along with lower capital and operating costs. A single rotor-drum containing the cylinders and pistons is located between two end blocks, one or both configured with manifold passageways, ports and sliding valves. A swash-plate at one end reciprocates the pistons axially when the rotor-drum is rotated. Two working chambers, primary and secondary, are formed at opposite ends of a single piston in each cylinder, thus enabling the single rotor-drum to function as a primary liquid-pressurizing axial pump (AP) with sliding valves at the primary end enabling primary liquid pumping, and as a secondary outflow-driven pressure exchanger (PX) recovering energy from pressure drop in the secondary liquid flow and thus contributing work to primary pumping, saving energy and reducing operating costs.

20 Claims, 8 Drawing Sheets

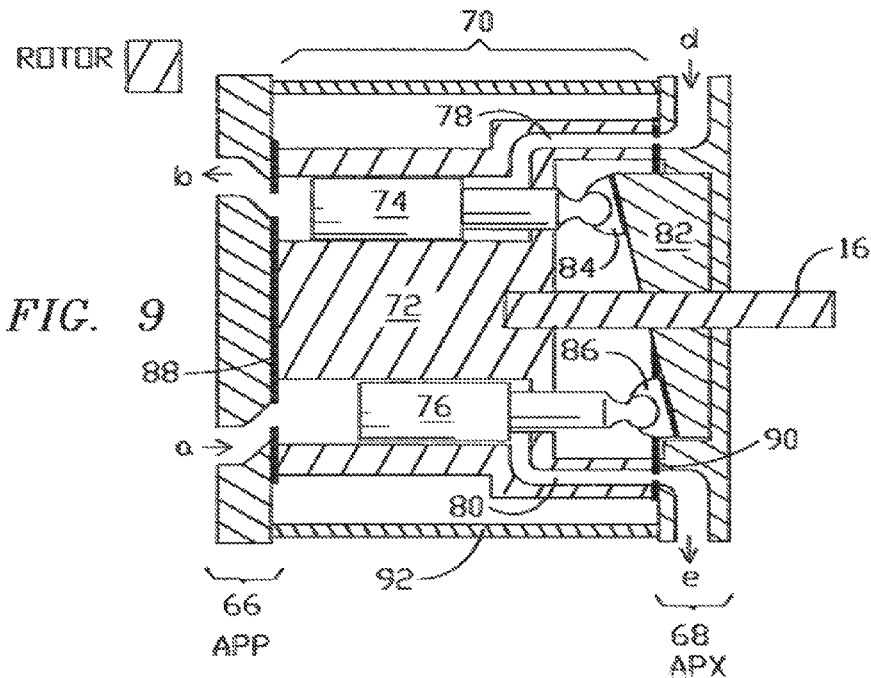
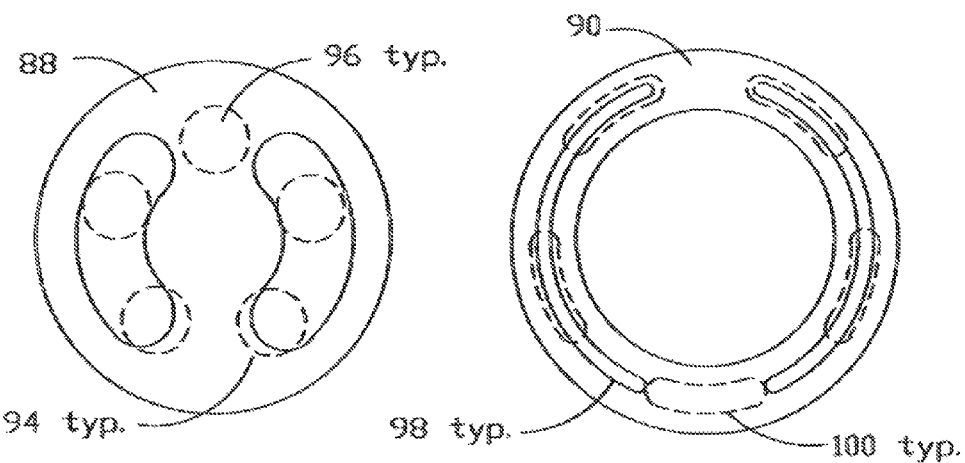

| NODE | P PRESSURE | F FLOW RATE | E ENERGY |
|---|---|---|---|
| a | 2% | 100% | 2% |
| b | 100% | 100% | 100% |
| c | 2% | 40% | 0.8% |
| d | 99% | 60% | 59.4% |
| e | 1% | 60% | 0.6% | und
COMBINED AXIAL PISTON LIQUID PUMP AND ENERGY RECOVERY PRESSURE EXCHANGER

CROSS-REFERENCE TO RELATED APPLICATIONS

This application is a continuation of U.S. patent application Ser. No. 12/008,772 filed Sep. 21, 2010, now U.S. Pat. No. 7,799,221, which is herein incorporated by reference in its entirety.

BACKGROUND OF THE INVENTION

1. Field of the Invention

The present invention relates to liquid pumps and more particularly it relates to structure of a rotary axial piston pumping unit, that can serve as the primary system pump pressurizing a system destination, such as an RO (reverse osmosis) chamber, the pumping unit incorporating a pressure exchanger for reducing the operating cost by recovering energy from a secondary flow that may be an unwanted byproduct from the process, for example brine discharged at high pressure from an RO seawater desalination system.

2. Background of the Invention

The functional block diagram of FIG. 1 shows a basic form of an RO (reverse osmosis) filtering system of known art without energy recovery, e.g., a small system for an individual home or small business. A pressurized RO enclosure 10 receives a water supply at its input node "a" at elevated pressure, either from municipal water mains or, as shown pressurized by a pressure pump 12 driven by a motor 14, typically electric. Pump 12 draws water from a relatively low pressure source such as a well, river or lake optionally via preconditioning and filtration apparatus, and develops high pressure at node "b", the intake port of the main chamber 10A of RO container 10, where the pressurized liquid is forced against an RO membrane 10B, typically polyamide thin-film composite that will not pass sodium or chloride ions. In RO seawater desalination, about 40% of the intake liquid traverses membrane 10B to compartment 10C as desalinated water, available to be drawn off as required at outlet "c". The remaining 60% of the input liquid including extracted residue leaves chamber 10A as a secondary flow of more concentrated unwanted components, such as the salt in brine, from the RO outlet port "d" where it passes through a back-pressure regulating valve 17 to discharge port "d" where the secondary flow is discharged to a drainage system as wastewater, typically returned directly or indirectly to the sea.

It has long been recognized that there is a substantial amount of energy Ed available in the secondary liquid flow at RO brine exit port "d", where, compared to 100% pressure Pb and flow rate Rb of the primary flow at intake port "b", the pressure Pd is typically 99% and the flow rate Rd is 60%.

The energy at the RO brine exit port "d" can be calculated from the product of pressure and flow rate (Ed=Pd*Rd): for the foregoing conditions, Ed is found to be 59.4% of Eb. Since the ultimate discharge from node "e" is typically at relatively low pressure, most of the waste energy is dissipated as heat at valve 17 and its environment. Efficient recovery of this energy can provide substantial savings in operating cost.

The energy available at the outlet valve 17 can be estimated from the reduction in pressure at the rated discharge flow; if this energy could be totally exchanged for a reduction in the electrical energy consumed by the motor driving the primary pump 12, the net energy recovery of 59.4% would reduce the operating energy cost to 40.6% of the operating energy cost of the basic non-recovery system of FIG. 1. However, practical systems can only approach this limit due to unavoidable machine losses such as friction of bearings, and pistons, and leakage of seals, pistons and valves, turbulence, etc. Thus the design of more efficient systems of this kind remains a challenge with potential that has not yet been fulfilled by known art.

FIG. 2 illustrates a system as in FIG. 1 modified to include energy recovery by the addition of an energy exchanger 18, connected into the RO brine discharge flow path between nodes "d" and "e" in place of valve 17. Energy recaptured from pressure drop in this flow is fed back to the primary liquid flow side between nodes "a" and "b" as indicated by the arrow.

Many different approaches have been suggested and tried for implementing this energy feedback. The flow/pressure drop energy recaptured in a liquid motor such a turbine from which torque can be applied to shaft 16 of the primary RO pressurizing pump 12. Alternatively or additionally, the recovered energy torque can drive an auxiliary pump or equivalent introduced in series and/or parallel with the existing primary pump 12 to reduce its pressure/flow rate loading, and thus reduce the electric power consumption of drive motor 14. The efficiency of this energy exchange system is critically important since it directly affects the actual amount of operating cost savings realized. Electric motor efficiency is about 90-95% and pump efficiency ranges from 50 to 90%, typically 80%, so these machines are generally selected for high efficiency.

Energy and pressure exchange systems have been the subject of much design research, development and refinement to reduce capital costs and operating costs; with increasing concern about world wide consumer water availability, there are increasing efforts to develop machines that recapture energy from RO brine discharge even more efficiently to accomplish more cost-effective desalination.

DISCUSSION OF KNOWN ART

Several different approaches have been disclosed in patents for apparatus performing the function of energy/pressure exchange, e.g., in the role of energy exchanger 18 in FIG. 2, for energy recovery in RO desalination systems.

FIG. 3 is a simplified functional block diagram illustrating a basic energy exchanger approach, as exemplified in U.S. Pat. No. 6,804,962 to Prueitt for a "Solar Energy Desalination System", wherein a hydraulic motor 20, driven by the flow of brine discharge from exit port d, has its shaft 21 coupled to the shaft 16 of the main motor 16 which also drives the main pump 12.

Hydraulic motor 20, typically a turbine, converts P*F hydraulic energy to mechanical energy, i.e., torque applied via shaft 22 to shaft 16, that acts to reduce the load on main motor 14 and thus reduces the electrical power consumption and the overall operating costs accordingly.

To estimate the efficiency of such a system, it is assumed that the system is designed and regulated so as to hold the RO input pressure and flow, thus the RO input energy Eb, constant. Assuming a typical high quality commercially available level of 90% efficiency (10% loss) for both the main pump 12 and for the hydraulic energy exchange motor 20, their combined efficiency will be 81% (19% loss); thus the net energy recovery of 48.1% would reduce the operating energy cost to 51.9% of that of the basic non-recovery system of FIG. 1, whereas the theoretical limits are 59.4% (recovery) and 40.6% (cost).

To avoid the compounding of energy loss by both the pump 12 and the hydraulic motor 20, various "pressure" and "energy" exchangers have been developed to exchange energy in a more direct and efficient manner, usually in cylinders with programmed valves and moving piston barriers between the output and input liquid flow paths, exchanging reduction of pressure in the outflow for contribution to RO input pressure and/or flow rate, thus reducing the work load on the main pump 12 and motor 14 for lower operating cost.

FIG. 4 shows a known AP (axial piston) pressure exchange system utilizing a pair of fixed dual-chamber cylinders 22 and 24 mounted between end block valve enclosures 26 and 27 under control of a timing system that causes free-moving pistons 28 and 30 to reciprocate in a manner to exchange pressure. Because pistons 28 and 30 are equal in diameter on both sides, the primary side acting as pump provides about 60% of the total primary flow, with pump 12 providing only the remaining 40%. However due to pipe and exchanger losses, a small pressure booster pump 32 and motor 34 must be added in the primary side. This approach is exemplified by U.S. Pat. No. 5,306,428 to Tonner for "Method of Recovering Energy From Reverse Osmosis Waste Streams" and U.S. patent application publication No. 2005/0166978 A1 to Brueckmann et al for "Pressure Exchanger System".

FIG. 5 shows a related AP approach: two dual-chamber cylinders 36 and 38 are disposed co-linearly in a common cylinder sleeve between end block valve assemblies 40 and 42. A free-moving pair of double-sided asymmetrical pistons 44 and 46, separating the two quasi-complementary chambers in cylinders 36 and 38 respectively, are coupled by a central rod 48 which traverses central partition 49 through a sliding seal. Rod 48 is specially dimensioned to reduce the effective piston area on one side of each piston, proportional to respective flow rates, thus eliminating the need for a booster pump and motor as in FIG. 4. This approach is exemplified in U.S. Pat. No. 4,637,783 to Andeen for "Fluid Motor-Pumping Apparatus and Method for Energy Recovery" and U.S. Pat. No. 5,462,414 to Permar for "Liquid Treatment Apparatus for Providing a Flow of Pressurized Liquid". In a similar arrangement disclosed in U.S. Pat. No. 6,017,200 to Childs et al for "Integrated Pumping and/or Energy Recovery System", the shaft-linked piston pair is driven by a pump to reciprocate axially.

While in each of the foregoing patents the two cylinders are shown equal in diameter, U.S. Pat. No. 3,293,881 to Walker for "Means for Transferring Fluids in an Absorption Refrigeration System" shows the two co-linear cylinders (and their respective free-moving central-shaft coupled pistons) made substantially different in diameter (see FIG. 2) to provide different flow rates which are proportional to piston area for a given stroke length.

It should be understood that the above descriptions of fixed cylinder type energy/pressure exchangers are greatly simplified for ease of understanding, while in real implementation they become extremely complex due to critical requirements of an elaborate control system for motor speed, flow rate, timing, synchronizing and sequencing the control valves and regulators with the reciprocating travel of driven or free-moving pistons as required to realize acceptable operating efficiency.

In a special category of pressure/energy exchangers similar to those described above with free-moving pistons, even these pistons are eliminated to avoid their friction losses and maintenance problems; the seawater and brine are allowed to interface directly at a virtual piston region, and the control system and/or operating staff must monitor and regulate flows, pressures, valve timings, rotational speeds, synchronization, etc., very diligently and precisely to minimize the unwanted effects of intermixing.

Whether through sophisticated computer automation or the diligence of skilled human operating staff, high operating efficiency for economical operation is extremely difficult and challenging to accomplish and maintain since it has to take into account many short term and long term side effects and variables such as temperature of liquids and machines, variation in demand and removal of desalinated product, power line voltage variations, membrane condition, leakage, wear degradation of machinery, seals, valves, etc.

Fluctuation in the cost of electric power is an important factor as evidenced by U.S. Pat. No. 6,998,053 B2 to Awerbuch for "Water Desalination Process Using Ion Selective Membranes" " . . . at a variable pressure as a function of the cost of electricity . . . ." Similarly, interest rates have been cited as influencing decisions involving capital costs versus operating costs in overall design tradeoffs, particularly for large scale projects.

Patent publication US 2007/0128056 A1 to Haudenschild for a "Highly Efficient Durable Fluid Pump and Method" discloses a piston, in a cylinder defining first and second volumes, driven reciprocally by an attached rod. Two ports of the stationary cylinder block are fitted with check valves 38 and 40 and two other ports are fitted with ball-type rotary valve units 42 and 44, driven from an external motor by a pair of rotating shafts 58 and 60.

FIG. 6 is a cross-sectional representation of an energy exchanger of the rotor-drum AP (axial piston) category in the field of endeavor addressed by the present invention. This AP rotor-drum category is exemplified in U.S. Pat. No. 3,431,747 to Hashemi et al for "Engine For Exchanging Energy Between High And Low Pressure Systems". Two cylinders 50 and 52 (or more) are formed as bores through a metal cylindrical rotor-drum 54, mounted to rotate between sliding end valve enclosures 56 and 58 and driven rotationally, typically from the shaft of a motor. A free-moving symmetrical double-sided piston is formed in each cylinder by lightweight spheres 60 and 62. A rotor-drum with free-moving pistons is also disclosed in European Patent Application EP 1,508,361 A1 by Olsen for "A Pressure Exchanger". Other AP rotor-drum type pressure exchangers are disclosed in U.S. Pat. No. 4,887, 942 to Hauge for "Pressure Exchanger for Liquid" and U.S. Pat. No. 6,659,731 B1 to Hauge for "Pressure Exchanger".

In recognition of the desirability of combining the main input pump with a pressure exchanger for energy recovery in a single self-contained unit, a combined primary pressure pump and energy/pressure exchanger utilizing swash-plate driven axial cylinder/piston arrays in rotor drums has been disclosed by the present inventor in U.S. patent application Ser. No. 11/523,937, filed Sep. 21, 2006.

In a special category of AP rotor-drum hydraulic pumps and motors addressed by the present invention, the axial pistons in a setoff cylinders arrayed radially in the rotor-drum are reciprocated by an angled swash-plate, sometimes referred to as a wobble-plate or cam-plate. This swash-plate AP rotor-drum category has been highly developed and used widely in hydraulic motors and/or pumps for refrigeration and industrial hydraulic machinery, as exemplified in U.S. Pat. No. 5,778,757 to Kristensen et al and U.S. Pat. No. 6,000,316 to Møller et al., both assigned to Danfoss A/S, Nordborg, Denmark under the title "Hydraulic Axial Piston Machine".

Swash-plate AP type units can be designed to function either as a pump or as a hydraulic motor, And, as such, they have been applied in oil hydraulic systems for decades, but only recently have there been good technological advancements in the field of water hydraulics where water is used as both the lubricating and hydraulic fluid instead of oil. As a result, water hydraulic AP pumps are now available made from materials suitable for seawater desalination and find use in salt water RO systems today. A water hydraulic pump is available from Danfoss Pump.

However, the concept of combining the hydraulic AP (axial piston) pump and hydraulic PX (pressure exchanger) motor in a single integral unit for use with non-oily liquids such as seawater remains a challenge unfulfilled by known art, subject to the discovery and development of new configurations with novel deployment of recently developed materials.

In principle, energy could be recovered in an RO process as in FIG. 3 utilizing a hydraulic swash-plate type motor driven from the output brine stream, shaft-coupled to assist the input pump which could also be of the hydraulic swash-plate type, subject to capability of handling seawater; however such an approach would require two hydraulic machines of special custom design and manufacture to operate with water and would still be subject to the compounding of transducer losses in both machines with the resultant limitation on efficiency as described above in connection with FIG. 3. The cylinders/pistons are arranged in two arrays, primary and secondary, each in a corresponding rotor-drum with typically nine cylinders a radial array, the two rotor-drums flanking a stationary swash-plate assembly that drives the pistons axially when the rotor-drums are driven rotationally from an external motor, typically electric. The pistons are arranged in collinear pairs, each pair coupled by a mechanical link that traverses a central opening in the swash-plate. The pistons in the primary array and their corresponding cylinders are made to have an effective diameter that is different than, typically larger than, that in the secondary array, as dictated by the physical liquid dynamics of the required pressure exchange.

The above-described disclosure represents a step of accomplishment in the advancement and ongoing development in the field of endeavor of primary liquid flow pumps of the AP swash-plate rotor-drum type incorporating pressure exchanger energy recovery, particularly as directed to seawater desalination.

OBJECTS OF THE INVENTION

It is a primary object of the present invention to provide further refinements beyond the art described above for enhancements in efficiency, reliability and cost effectiveness in the evolution of this field of endeavor, including simplification with fewer moving parts for long term reliability and low maintenance, thus accomplishing lower capital costs and lower operating costs.

It is a primary object to provide an improved hydraulic pump mechanism suitable to serve as the primary input pump of an RO system, incorporating structure that includes a pressure exchanger that recovers energy from the brine output flow of the RO system through direct pressure exchange without intervening energy conversions.

It is a further object to implement the combination pump utilizing proven aspects of rotor-drum rotational sliding valve port technology for both the APP (axial piston pump) function and the PX (pressure exchanger) function in novel combination that provides optimal benefit of recovered energy, particularly as applied to an RO desalination system.

It is a further object to minimize the number of moving parts in the combination pump and pressure exchanger.

It is a still further object that the implementation of the combination machine allows the pistons to rotate freely within the cylinders as practiced in known swash-plate type hydraulic motors and pumps, since this practice is considered beneficial with regard to long term reliability through even distribution of wear throughout the cylinder walls and pistons.

It is a still further object that the rotor be allowed to float freely axially between the two flat valve planes of the end blocks so that the liquid lubricant is allowed to form balanced seals at the interfacing surfaces at each end.

SUMMARY OF THE INVENTION

The above mentioned and other objects and advantages have been realized in a rotor-drum type APP (axial piston pump), for primary liquid flow pressuring, that incorporates a PX (pressure exchange) hydraulic motor function for energy recovery from a secondary liquid flow such as the brine discharge from an RO seawater desalination system. A single rotor-drum contains a set of dual function cylinders each containing a dual function axial piston. The system can be optimized for efficient deployment in an RO system to provide benefits including unusual simplicity, compact machine size and low capital and operating costs. Long term reliability is enhanced by the pistons being made free to rotate in place within the cylinders for uniform distribution of frictional wear. Special materials, tolerances and configurations such as lubrication ducts directed to the swash-plate sliders enable liquid such as seawater to act as lubricant.

BRIEF DESCRIPTION OF THE DRAWINGS

The above stated and further objects, features and advantages of the present invention will be more fully understood from the following description taken with the accompanying drawings in which:

FIG. 9 is a quasi-cross-sectional representation showing the interior configuration of the machine of FIG. 8.

FIG. 10 depicts the primary stator sliding valve plate of the machine of FIG. 9.

FIG. 11 depicts the secondary stator sliding valve plate of the machine of FIG. 9.

DETAILED DESCRIPTION

Figure 1:
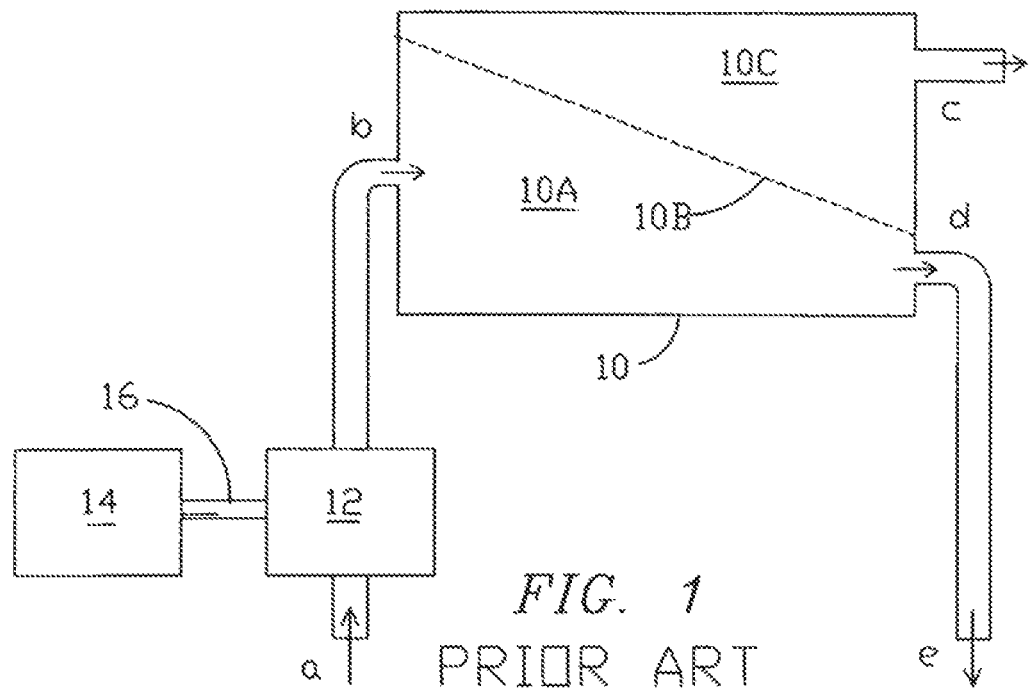
FIG. 1 is a functional block diagram of a basic RO system without energy recovery as described above in connection with background of the invention.
Figure 2:
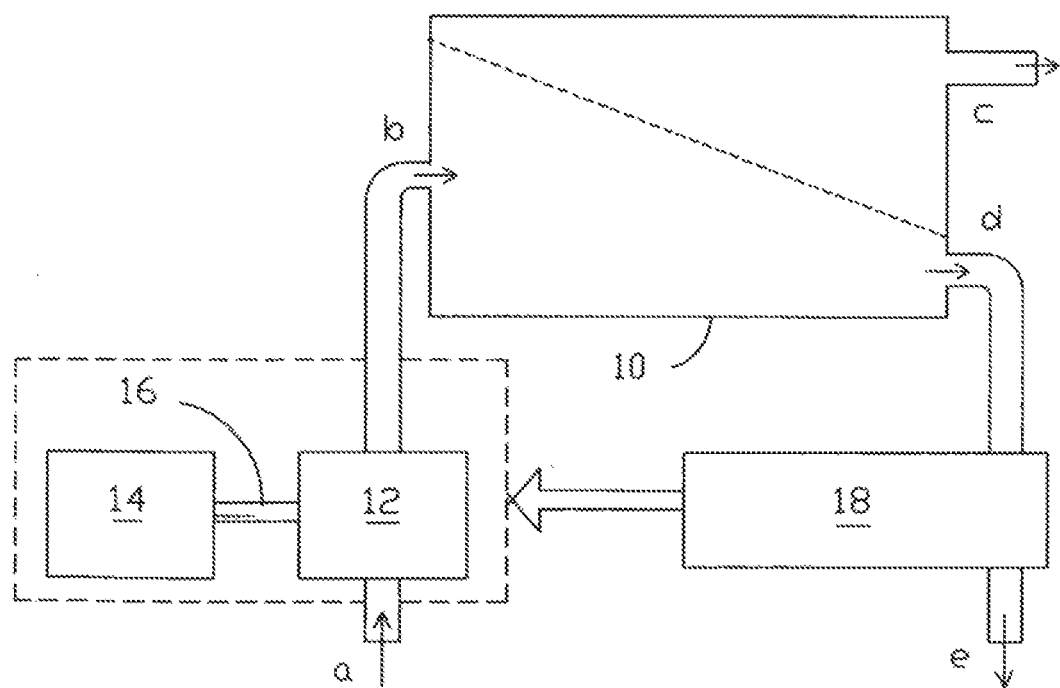
FIG. 2 is a functional block diagram of a basic RO system as in FIG. 1 with the addition of energy recovery from the brine discharge as described above in connection with background of the invention.
Figure 3:
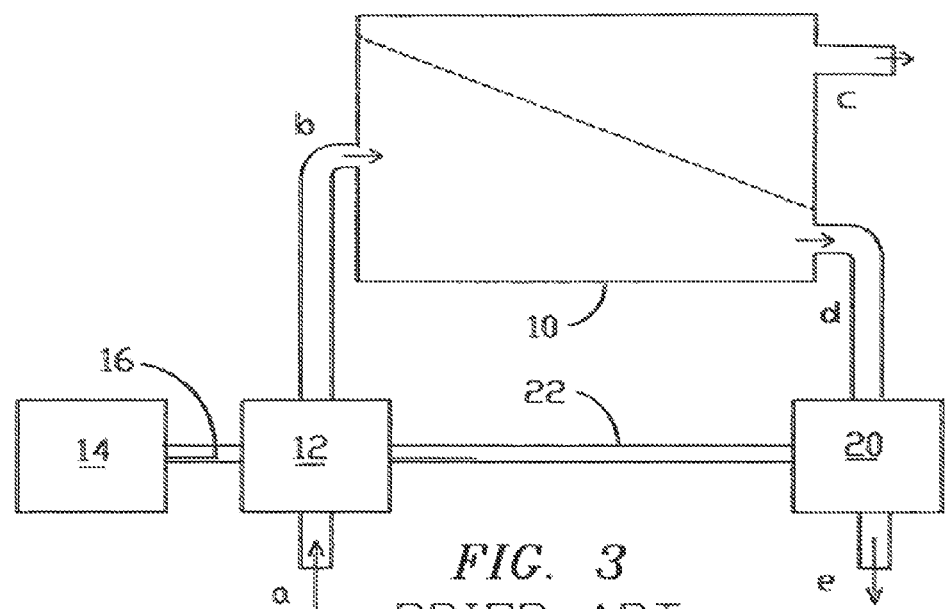
FIG. 3 depicts an implementation of FIG. 2 with energy recovery utilizing a hydraulic motor shaft-coupled to the primary pump as described above in the discussion of known art.
Figure 4:
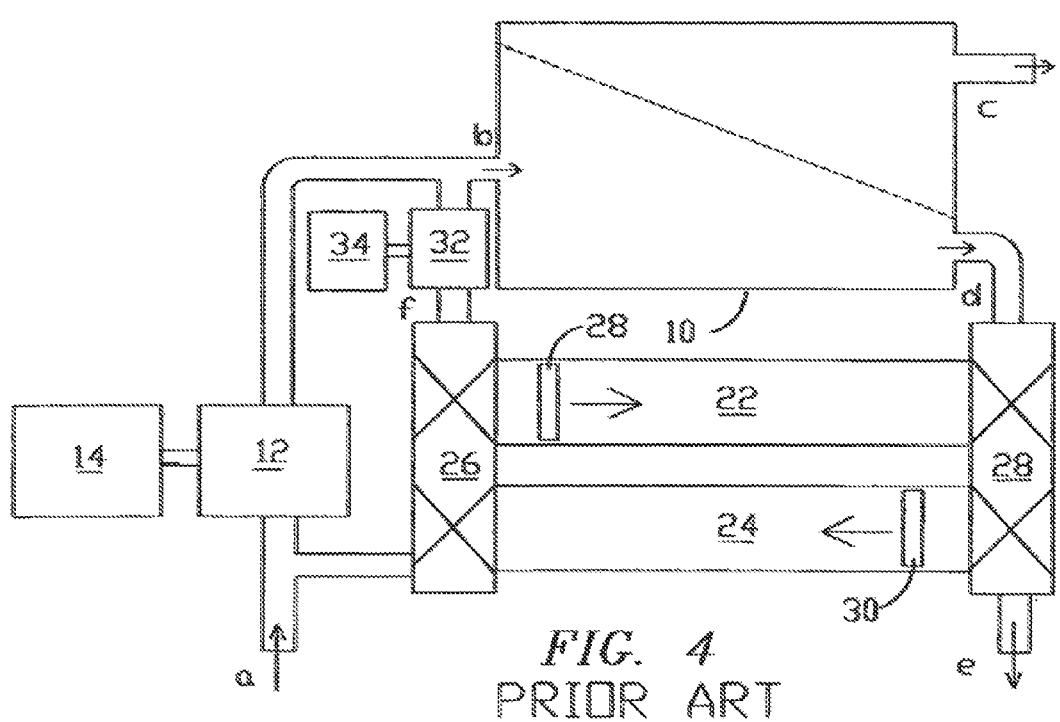
FIG. 4 is a functional block diagram of a known RO system with energy recovery utilizing a pressure exchanger with a free-floating piston in each of two cylinders as described above.
Figure 5:
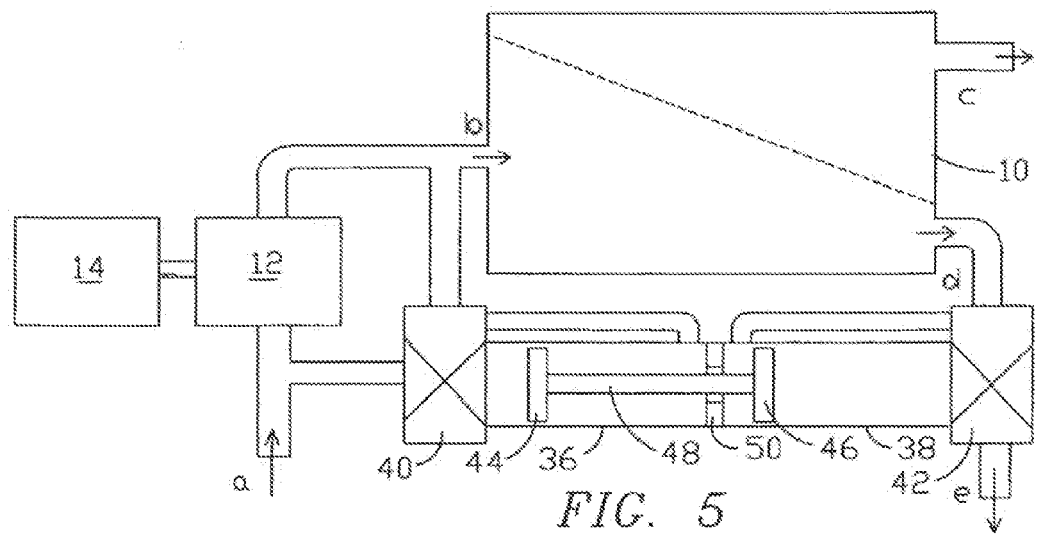
FIG. 5 is a functional block diagram of a known RO system with energy recovery utilizing a pressure exchanger with a coupled pair of pistons free-floating two co-linear cylinders as described above.
Figure 6:
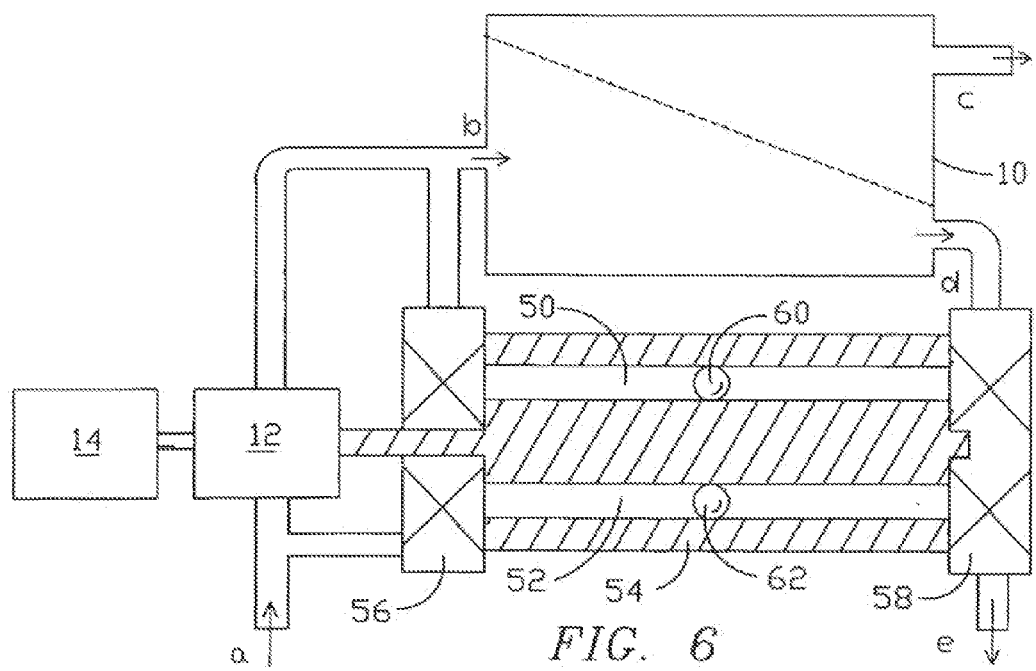
FIG. 6 is a functional block diagram of a known rotor-drum type pressure exchanger with two cylinders each containing a free-floating spherical piston as described above.

FIGS. 1 and 2 have been described above in connection with the discussion of background of the invention. FIGS. 3-6 have been described above in connection with the discussion of known art.

Figure 7:
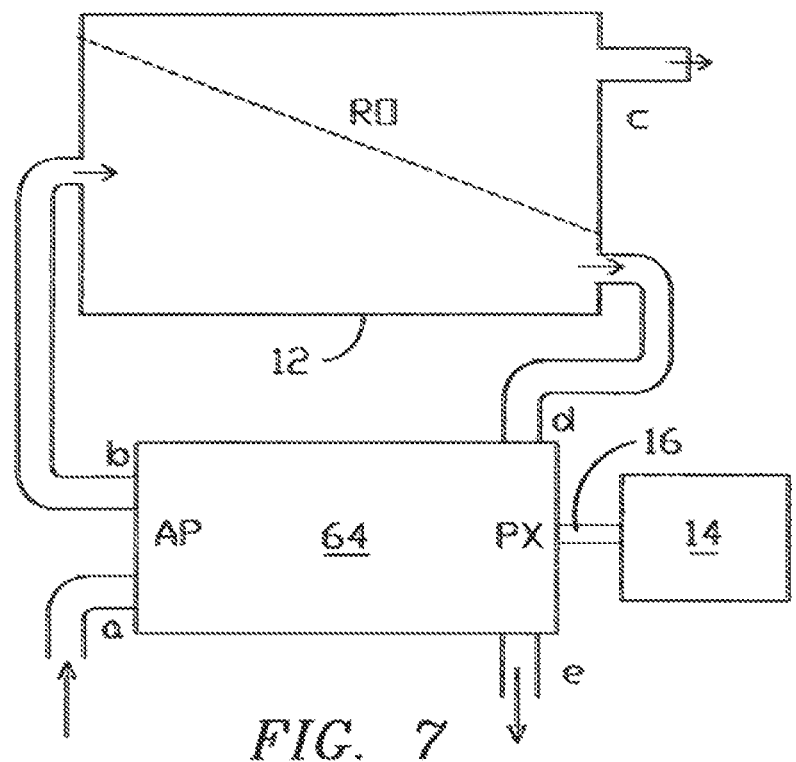
FIG. 7 is a functional block diagram showing a single machine combining a pressure pump and a pressure exchanger according to the present invention deployed as the primary pump in a reverse osmosis desalination system.

FIG. 7 is a functional block diagram showing a single machine 64 combining a pump and a pressure exchanger in accordance with the present invention, deployed as the primary pump in a reverse osmosis desalination system. The machine 64 is a self-contained unit that includes the main primary flow pressure pump and a secondary (brine) flow actuated energy exchanger PX assisting the pump AP.

Machine 64 is connected to RO unit 12 seawater intake flow path (ports/nodes a and b) which receives seawater at low pressure from pre-conditioning apparatus, and the brine output flow path (ports/nodes d and e) in the simple and direct manner shown: all that is needed additionally to operate the RO unit 12 is the electric motor 14 driving shaft 16, seawater acquisition and preconditioning apparatus, and the interconnecting pipelines, with minimal requirements for associated control and monitoring apparatus, primarily to regulate motor speed for RO input pressure and flow rate.

Figure 8:
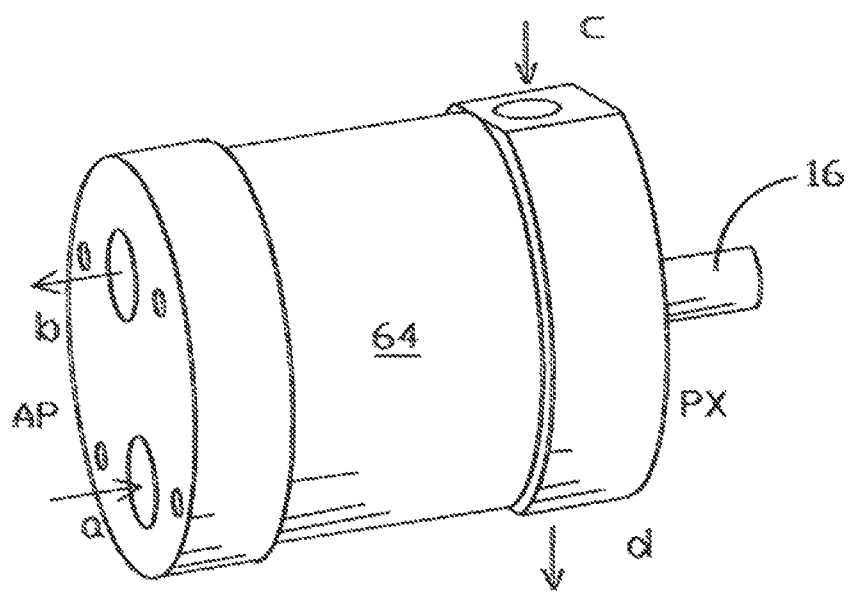
FIG. 8 is a three-dimensional view of the exterior of the machine of FIG. 7 in a primary embodiment of the present invention.

FIG. 8 is a three-dimensional view of the exterior of a combined axial piston type pump and energy-recovery pressure-exchanger 64 in a preferred embodiment of the present invention with liquid flow indicated by the four arrows.

At the left hand end, inlet port "a" and outlet port "b" are in the primary flow path. At the right hand end inlet port "d", shown at the top, and associated outlet port "e" at the bottom but not visible in this view, are in the secondary flow path. Drive shaft 16, at the right hand end, is provided for connection to a drive motor, typically electric, to rotate an internal rotor-drum.

FIG. 9 is a quasi-cross-sectional representation of machine 64 of the present invention as in FIGS. 7 and 8. A pair of end blocks 66 (AP) and 68 (APX) interface opposite ends of a rotatable rotor-drum assembly 70 wherein a rotor-drum 72 driven by shaft 16 is configured with a set of cylinder bores arranged axially in a polar array and extending uniformly to open ends at the left hand primary end. Each cylinder contains a closely fitted piston as exemplified by pistons 74 and 76 shown this view.

The number of cylinders in a rotor-drum is a matter of design choice, subject to appropriate valve design; it could even function with a single cylinder (subject to balancing difficulties); however for clarity and ease of understanding, in FIGS. 9 and 12-15 two cylinders are shown as being located diametrically opposite each other, i.e., 180 degrees apart, as they would be in a rotor-drum having an even number of cylinders. Since the cylinders function in uniform sequence, the present descriptions are valid for any number of cylinders, e.g., five as in the preferred embodiment.

At the left hand APP primary end, the inner face of primary end block 66 is configured as a manifold with a pair of cavity compartments, one for the primary intake port "a" and one for primary outlet port "b" (refer to FIGS. 7 and 8); these are shaped to function as primary valve ports. Attached on the flat inner surface of end block 66 is a primary stator plate 88 which is made of special liquid-lubricated material and which forms a sealed sliding valve interface that interfaces the flat primary end of rotor-drum 72 forming valve ports directly at the open ends of the primary cylinders and provides rotary valve commutation for the primary pump function.

At the right hand secondary end, a set of passageways, e.g., passageways 78 and 80, are configured in a peripheral extended secondary region of rotor-drum 72 each leading outwardly from a side location of a corresponding secondary cylinder to a corresponding valve port in the flat annular secondary end region of rotor-drum 72, interfacing a secondary stator plate 90, attached to or made part of secondary end block 68, which is configured as a manifold with a pair of compartments in communication with secondary inlet port d and secondary outlet port e, thus providing rotary valve commutation for the secondary pressure exchanger function.

A swash-plate 82, at the inward side of the secondary end block 68, presents a liquid-lubricated angled flat surface that serves to reciprocate the pistons, e.g., 74 and 76, via slide pads 84 and 86 attached to the spherical ends of the piston drive rods in a swivel manner, as the rotor-drum assembly 70 is rotated by a motor coupled to shaft 16. Piston 74 is shown at the left hand end of its stroke while piston 76 is shown at the right hand end of its stroke, in accordance with their locations on the swash-plate 82 at the particular point of time/rotation. Swash-plate 82 shown as a separate part with a wedge shape, thicker at the top, attached to end block 68, could be made as an integral part of end block 68 in a single piece, or alternatively the swash-plate could be made uniform in thickness and attached to a wedge-shaped support part configured specially in end block 68.

In the secondary cylinder chambers, the coaxial piston drive-rods each extend through a corresponding sealed circular slide-bearing opening in a bulkhead region of rotor-drum 72, thus forming a working secondary cylinder chamber at the secondary end of each piston. In this secondary cylinder region, the effective area of each piston is reduced by the presence of the drive rod by an amount equal to the cross-sectional area of the drive rod. In overall design, these rods are dimensioned particularly to make the ratio of effective secondary/primary piston area equal to the ratio of secondary/primary liquid flow rate, the piston stroke length being the same for both the primary and secondary cylinder regions. A tubular outer shell 92 extends between the end blocks 66 and 68.

FIG. 10 depicts the primary stator sliding valve plate 88, of the machine of FIG. 9, which serves as reversing/commutating liquid-lubricated sliding valve commutating the fluid communication between the open ends of the primary cylinder chambers, e.g., end 96 aligned circularly with arcuate kidney-shaped pair of slots 94, forming valve ports, and two manifold chambers configured as a manifold in primary end block 66 (FIG. 9) that includes primary intake/outlet ports a and b respectively. These valve ports remain open to those cylinders whose piston is moving throughout a half-revolution stroke, but can be allowed to close for each cylinder at stroke-end locations for reversal transition, as the liquid flow ceases momentarily.

FIG. 11 depicts the secondary stator valve plate 90 of the machine of FIG. 9. A symmetrical pair of arcuate kidney-shaped valve apertures 98 are aligned with the circular rotational path of the set of five arcuate valve ports 100, shown in broken lines, formed at the ends of the passageways, e.g., 78 and 80 in rotor-drum 72 (FIG. 9), providing sliding valve commutation of fluid communication through the passageways to the corresponding secondary cylinder chambers. The secondary valve stator plate apertures 98 are made narrower than the primary valve stator plate apertures 94, but their operation is similar. These apertures are carefully sized in design to balance the thrust on the rotor-drum sliding valve surfaces.

Figure 12:
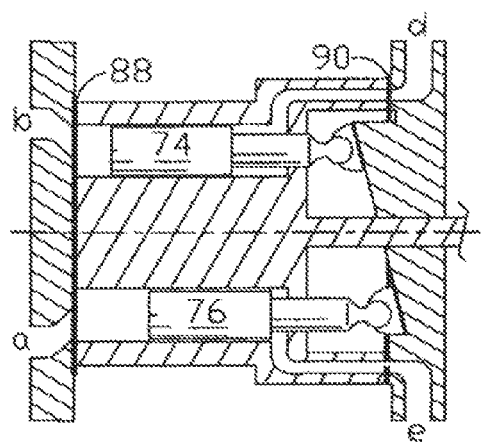
FIGS. 12-15 show four sequential operating conditions of the pistons and valves of the machine of FIGS. 8 and 9 within a revolution of rotation of the rotor-drum.

FIG. 12 is the first of four sequential functional quasi-cross-sectional representations, FIGS. 12-16, depicting piston and valve operating conditions in a single revolution of the rotor-drum assembly of any embodiment of the present invention, as exemplified in FIGS. 7-11. At the starting point of rotor-drum revolution shown in FIG. 12, piston 74 is shown having traveled axially to the left hand limit of its travel range, while piston 76 is shown having traveled axially to its right hand travel limit.

Pistons 72 and 74 at opposite limits of their respective axial travel range as dictated by the swash-plate-driven stroke; at this instant there is virtually no liquid flow in or out while the sliding valve ports are typically closed in a brief transition interruption in their role of sequentially diverting cylinder liquid flow path alternately between the intake and the outflow ports in synchronism with rotor-drum rotation.

Figure 13:
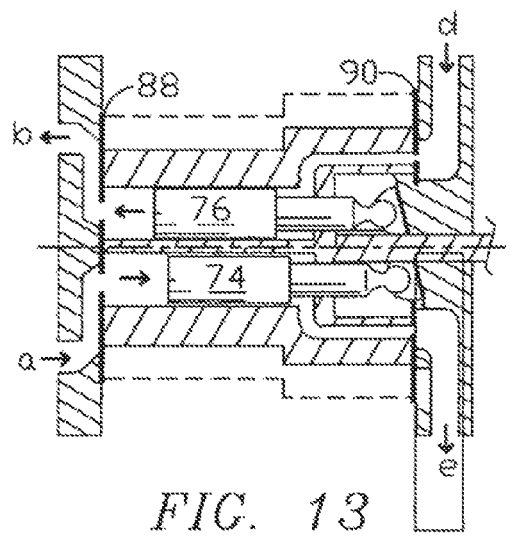

FIG. 13 shows pistons 72 and 74 moving in the directions indicated by the arrows, the rotor-drum having rotated about a quarter revolution and shifted the pistons to a mid-stroke region of the travel range as driven by the swash-plate. Piston 76 is moving axially to the left as indicated by the arrow, driven by the stationary swash-plate as the rotor-drum rotates; piston 76 also receives a portion of its driving force from the high pressure of secondary liquid entering via the arcuate slot of secondary stator valve plate 90 (FIG. 11) from intake port "d", acting on the of piston 74 in the secondary (right hand end) cylinder chamber. The left hand end of piston 74, in the primary cylinder chamber, is acting in a pump pressure stroke, performing the work of moving primary liquid under pressure to its destination through primary stator valve plate 88 (FIG. 10) and port b. Simultaneously, piston 74, moving to the right in an output stroke as indicated, is expelling secondary liquid from the secondary chamber through stator valve plate 90 and port "e" while the left end of piston 74, in an intake stroke, is drawing primary liquid into the primary chamber through valve plate 88 and port "a".

Throughout a major portion of each half-revolution stroke, the ports in the rotor-drum and the stator valve plates are made and arranged to align and co-operate as sliding valves to provide the required liquid flow path between each primary and secondary cylinder chamber and the corresponding one of the four intake/output ports: "a", "b", "d" and "e".

Figure 14:
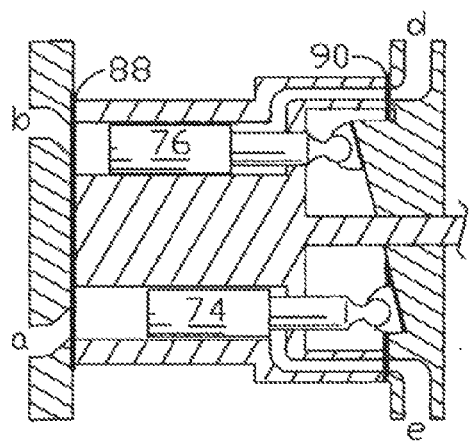

FIG. 14 shows the rotor-drum having rotated about a quarter revolution further to end of the half revolution stroke with pistons 74 and 76 having reached the end of their axial travel range opposite to their locations in FIG. 12: at this point, pistons 74 and 76 have become interchanged in both their axial and radial locations, and again as in the FIG. 12, there is no primary or secondary liquid flow, as the valves are in a state of transition.

Figure 15:
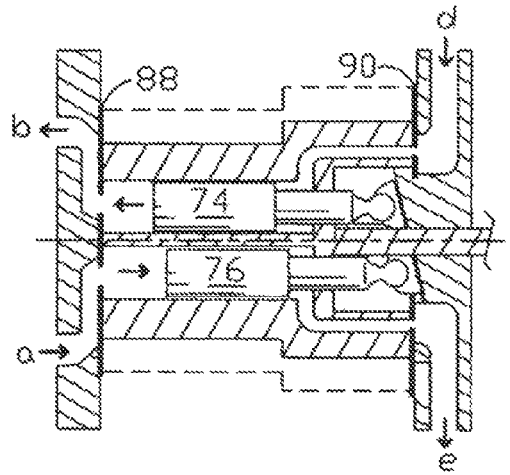

FIG. 15 shows the rotor-drum having further rotated about a quarter revolution to the three quarter revolution mid-stroke region where the actions and liquid flow are identical to those shown and described in connection with FIG. 13 except that now the roles of the two pistons 74 and 75 have become interchanged, and they will continue to travel in the directions indicated during the fourth quarter of revolution of rotation until once again the rotor-drum returns to the initial condition shown in FIG. 12, after which the same cycle repeats for each revolution of the rotor-drum.

Continuous repetition of these two-stroke cycles at a suitable regulated motor speed produces the desired destination pressure and energy-recovery-assisted flow rate at port b of the machine, which in an RO system is the main node, i.e., the main intake port of the RO chamber (node "b", FIG. 7), at a required energy level, i.e., product of pressure and flow rate. A substantial portion of this energy may be recovered from the waste brine flow by highly efficient performance of the pressure exchanger in reducing the loading on the pumping action of the primary cylinder assembly and thus substantially reducing the electric power consumed by the pump drive motor and reducing the operating cost accordingly.

As an alternative to the valve/port configuration shown in FIGS. 9-11, the pumping machine of this invention could be implemented with manifold cavities in primary end block 66 that would locate ports a and b on the top and bottom of end block 66 facing radially instead of axially as shown. Similarly the manifold cavities and passageways 78 and 80 in secondary end block 68 could be configured differently so as to locate ports d and e on the end surface of end block 68 facing axially instead of radially as shown.

Figure 16:
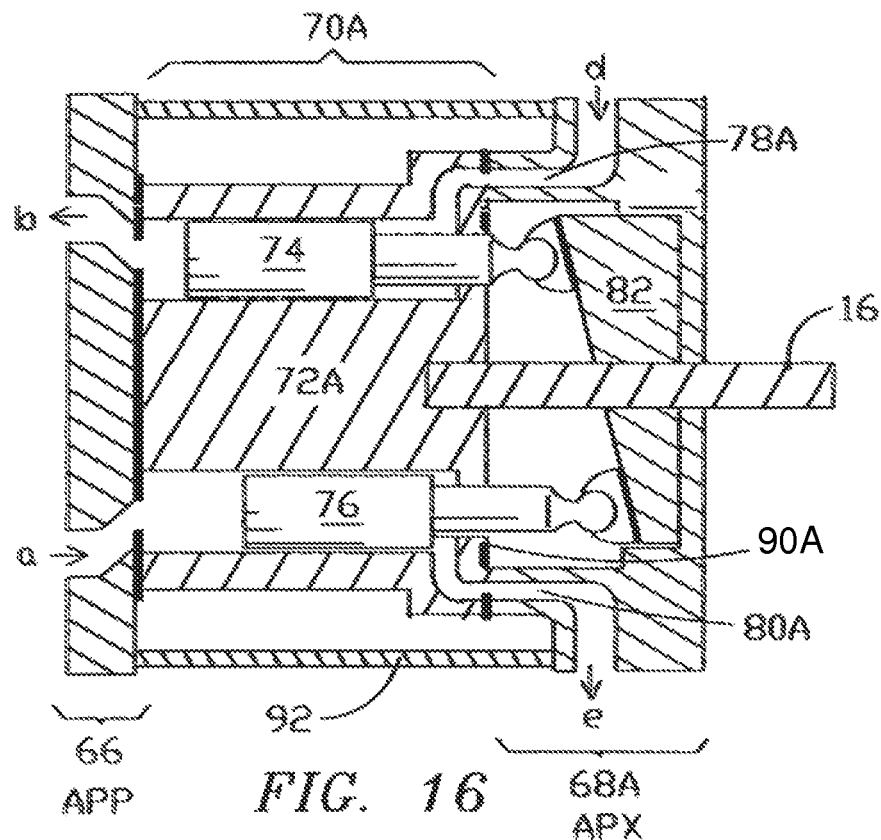
FIG. 16 is a quasi-cross-sectional representation of an alternate version of the secondary portion of the pumping machine of FIGS. 8-11.

FIG. 16 is a quasi-cross-sectional representation of an alternative version of the primary embodiment of the pumping machine of the present invention as shown in FIG. 9, wherein the secondary stator sliding valve plate 90A has been relocated inwardly to a plane that defines a flat secondary end of rotor-drum 72A. The APX end block 68A is configured with passageways 78A and 78B as part of the dual manifold cavities communicating with ports d and e. The stator sliding valve plate 90A is similar to the counterpart in the previous version (FIG. 9).

Figure 17:
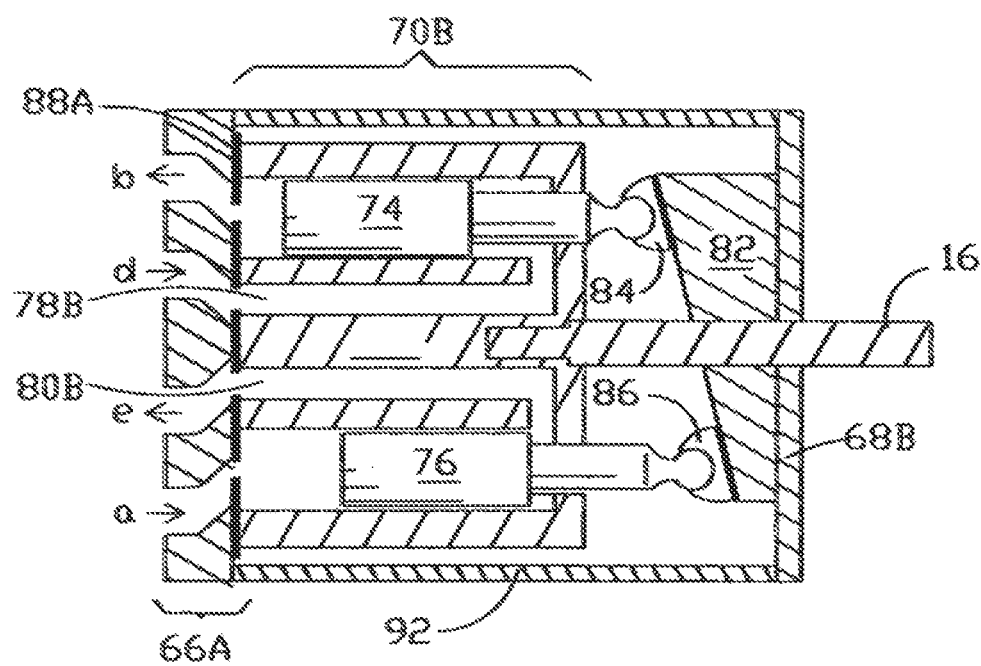
FIG. 17 is a quasi-cross-sectional representation of an alternative embodiment of the pumping machine of the present invention with all valves and ports located in the primary end block at the primary end of the rotor-drum.

FIG. 17 is a quasi-cross-sectional representation of a second embodiment of the pumping machine of the present invention as an alternative to the primary embodiment, e.g., as shown in FIG. 9. The main difference is that a set of passageways, e.g., passageways 78B and 80B, configured in rotor-drum 72B, are directed inwardly from each secondary cylinder end and thence to the primary end thus enabling all valves and ports a, b, d and e to be located at the primary end with manifolds configured in primary end block 66A where a single dual-function stator sliding valve plate 88A slidingly interfaces the primary end of the rotor-drum 72B as shown.

Pistons 74 and 76, sliders 84 and 86, swash-plate 82, shaft 16 and tubular outer shell 92 may be essentially the same as in the primary embodiment (FIG. 9).

A simple end plate 68B serves as the secondary end block, requiring no manifold cavities or ports. This embodiment enables the pumping machine to be made smaller and simpler than the primary embodiment, however it will require design attention to pressure effects at the valve interface since it does not receive benefit of the primary embodiment's inherent degree of interface pressure balance between the two valve units due to their location at opposite ends of the rotor-drum.

Figures 18, 19:
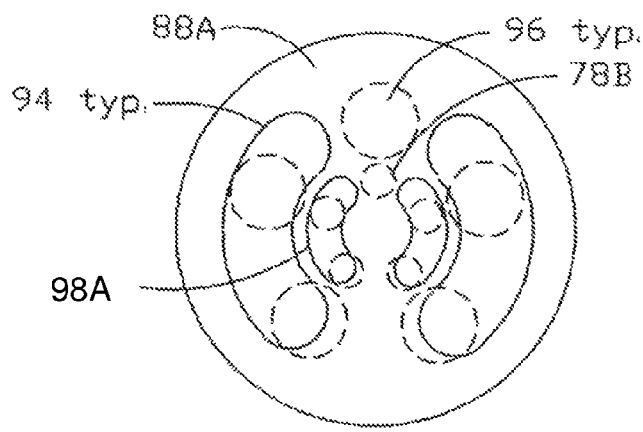
FIG. 18 depicts the single dual-function stator sliding valve plate of the machine of FIG. 17.
FIG. 19 is a table showing nominal values of pressure P, flow rate F, and energy (P*F) at five system nodes of a reverse osmosis system as shown in FIG. 7

FIG. 18 depicts the single dual-function stator sliding valve plate 88A of the machine of FIG. 17 with arcuate kidney-shaped primary valve ports 94 interacting with open cylinder ends 96, essentially the same as in the primary embodiment (FIG. 10), and the secondary arcuate kidney-shaped valve ports 98A interacting with open passageway ends, e.g., passageway 78B.

FIG. 19 is a table showing nominal values of pressure P, flow rate F, and energy (P*F) at five system nodes of a reverse osmosis system as shown in FIG. 7 operating from the combination machine of the present invention; four of the five system nodes correspond to the machine's primary and secondary intake/output ports.

In any of the embodiments, all of the interfacing sliding-valve surfaces and the swash-plate/slider surfaces are preferably precision-machined, polished or otherwise configured for water-lubricated sliding action and kept lubricated, e.g., by liquid from the primary and/or secondary liquid flow.

Ideally the slide pad surfaces are specially configured with a combination of super-flat surfaces and strategic cavities that enable them to hydroplane against the swash-plate on a film of liquid lubricant.

As described above in connection with the illustrative embodiment, the five dual-function cylinders located on a common polar array with the five associated dual-function pistons makes the rotor-drum assembly simple and straightforward with only about half the moving components required for an equivalent APP/PX machine having two rotor-drums, i.e., one primary and one secondary, straddling the swash-plate. Furthermore there are performance advantages of inherent rotor balance, smoothness of rotation, freedom from binding effects, and reliability due to the minimum number of moving parts. Thus it is believed that this integrated primary/secondary cylinder/piston arrangement accomplishes an unusually simplified, elegant, cost effective and reliable machine of this category. The illustrative embodiment represents a special case of convergence of judicious choice, amongst numerous possible variations, that yields an optimal manner in which the invention may be practiced.

There are some alternatives and matters of design choice with which the invention could be practiced with comparable if not totally equivalent benefit, and there are many more alternatives that would function generally but that could introduce tradeoffs of various degrees of degradation such as added complexity, production difficulty, increased cost, and potential loss of reliability.

As a matter of design choice, the quantity of cylinders/pistons in the rotor-drum assembly is not particularly critical, e.g., six or seven or more could function as well as five. Technically the invention could be practiced with as few as two, and possibly with one, but would risk inherent unbalance and vibration, and could require a more complex reversing valve and control system.

In any embodiment of the invention, as an alternative to implementing the stator valve plates (e.g., 88 and 90, FIG. 9) as separate plates affixed to the end blocks 66 and 68, either or both could be made as an integral part of the associated end block, subject to proper material selection for liquid-lubricated sliding valve surfaces.

Shaft 16 could be extended from the primary end of the machine instead of the secondary end as shown, or it could be made to extend from both ends.

The swash-plate being also known and described in literature as a cam-plate, and even sometimes regarded as a subdivision under the heading of cam mechanisms, suggests that there are other forms of cam mechanisms or modifications of swash-plate mechanisms capable of converting shaft rotation efficiently into reciprocation for pistons in cylinders, with which the present invention could be practiced as design choice alternatives to the embodiment shown.

There are viable alternatives in implementing the rotor-drum assembly. The cylinders may formed as simple bores traversing an otherwise solid drum, or the cylinders walls could be made individual and replaceable by utilizing tubular cylinder liner inserts. The drum may made in the form of a framework instead of solid for material savings, or the cylinders may be formed as individual stand-alone sleeves cantilevered from a base at one end or supported at both ends by circular end disks.

End-block reversing-valve systems have been utilized in hydraulic machines, typically along with swash-plate reciprocation in conjunction with axial cylinder rotor-drums, providing advantages of elegant simplicity. However with evolving technology there is increasing potential of alternatively performing the valve reversal function under more sophisticated electronic system control that may enable practice of the invention with equivalent results.

While shown as directed to reverse osmosis seawater desalination, the principles of the energy-recovering pump-motor combination of the present invention are not limited thereto and may be beneficially applied to any two liquid flow streams and/or to liquids other than water and/or to other liquid flow energy exchange requirements, e.g., regular filtration and purification of drinking or other fresh water supplies.

While it is not essential for all the cylinders in one assembly to be the same size or to be uniformly spaced in a single circular polar pattern as shown, a uniform array pattern is generally preferable for providing inherent rotor-drum balance and thus minimizing vibration. However, subject to risk of vibration and increased cost and complexity regarding suitable reversing valve arrangements, virtually any pattern of multiple identical or different-sized cylinders could be made to function as long as their total piston area meets the necessary designated primary and secondary flow requirements. The ratio between the total piston areas in the primary and in the secondary cylinder assemblies is a key parameter that must be observed since it is inherently equal to the ratio between the primary flow rate and the secondary flow rate, for a given stroke length.

The swash-plate principle for developing reciprocation is based on relative rotation between two portions, shown herein as a rotor portion including the cylinders and pistons and a stator portion including the swash-plate and the end block valve system. The same functions could be performed with the present stator components being rotated and the present rotor components made stationary, with appropriate and possibly more complex modification of the reversing valve system. Alternatively the functions could be performed with both portions rotating at different rates and/or directions, but probably at the expense of further complication and increased cost.

The invention may be embodied and practiced in other specific forms without departing from the spirit and essential characteristics thereof. The present embodiments are therefore to be considered in all respects as illustrative and not restrictive, the scope of the invention being indicated by the appended claims rather than by the foregoing description; and all variations, substitutions and changes which come within the meaning and range of equivalency of the claims are therefore intended to be embraced therein.

What is claimed is:

1. A combined axial-piston liquid pump and energy-recovery pressure exchanger comprising:
   a rotor-drum having a plurality of cylinders arranged in a radial array, the cylinders extending axially between primary and secondary rotor-drum ends, wherein each cylinder comprises a cylinder bore extending from a cylinder open end to an opposed partially closed end;

a primary block end positioned adjacent the rotor-drum primary end;

a secondary end block positioned adjacent the rotor-drum secondary end;

a plurality of pistons, each disposed in a respective cylinder, each piston having a cylindrical-shaped main portion positioned adjacent the primary end and having an extending drive-rod extending through an opening in the secondary end, wherein each cylinder comprises a primary chamber in fluid-flow communication with the piston main portion and a secondary chamber in fluid flow communication with the piston drive rod;

primary valve means disposed adjacent the rotor-drum primary end to provide fluid inlet and outlet communication with the primary chamber of the cylinders;

secondary valve means disposed adjacent the rotor-drum secondary end to provide fluid inlet and outlet communication with the secondary chamber of the cylinders; and driving means for rotating the rotor-drum relative to the primary and secondary end blocks and reciprocating the pistons axially within respective cylinders.

2. The combined axial-piston liquid pump and energy recovery pressure exchanger as defined in claim 1 wherein said primary end block comprises an intake port and an outlet port for respectively receiving and delivering primary liquid, and wherein said secondary end block comprises a secondary intake port and an outlet port for respectively receiving and delivering secondary liquid.

3. The combined axial-piston liquid pump and energy recovery pressure exchanger as defined in claim 1 wherein said driving means comprises:

a swash-plate disposed adjacent the rotor-drum secondary end and having an inclined surface; and a set of sliders each connected with respective pistons and placed into contact with the swash-plate.

4. The combined axial-piston liquid pump and energy recovery pressure exchanger as defined in claim 3 wherein said swash-plate is formed integrally as a single part along with said secondary end block.

5. The combined axial-piston liquid pump and energy recovery pressure exchanger as defined in claim 3 wherein said swash-plate is formed separately as an additional part affixed to said secondary end block.

6. The combined axial-piston liquid pump and energy recovery pressure exchanger as defined in claim 5 wherein said rotor-drum is configured with a coaxial driveshaft, made and arranged to receive rotational drive from an external motor so as to impart rotation to said rotor-drum.

7. The combined axial-piston liquid pump and energy recovery pressure exchanger as defined in claim 5 wherein said primary and secondary valve means are made and arranged to function as reversing valves that open and close in a predetermined sequential manner in response to relative rotation between said rotor-drum and said primary and secondary end blocks and resultant reciprocation of the pistons, so as to enable pump action in the cylinder primary chambers and pressure-exchange energy recovery in the cylinder secondary chambers.

8. The combined axial-piston liquid pump and energy recovery pressure exchanger as defined in claim 1 wherein said primary valve means comprises:

a primary flat end surface of said rotor-drum being configured with a set of apertures constituting open primary ends of the cylinders; and said primary end block including a primary stator valve plate configured with primary valve port apertures.

9. The combined axial-piston liquid pump and energy recovery pressure exchanger as defined in claim 8 wherein the primary valve plate is formed integrally as a single part along with said primary end block.

10. The combined axial-piston liquid pump and energy recovery pressure exchanger as defined in claim 8 wherein the primary valve plate is formed separately as a separate part affixed to said primary end block.

11. The combined axial-piston liquid pump and energy-recovery pressure exchanger as defined in claim 4 wherein said secondary valve means comprises:

a secondary flat end surface of said rotor-drum being configured in an annular peripheral region of the secondary end of said rotor-drum with a set of valve port apertures, each connected in fluid communication with a corresponding cylinder secondary chamber; and said secondary end block including a secondary valve plate configured with a pair of secondary valve port apertures.

12. The combined axial-piston liquid pump and energy recovery pressure exchanger as defined in claim 11 wherein the secondary valve plate is formed integrally as a single part along with said secondary end block.

13. The combined axial-piston liquid pump and energy recovery pressure exchanger as defined in claim 11 wherein the secondary valve plate is formed separately as a separate part affixed to said secondary end block.

14. The combined axial-piston liquid pump and energy recovery pressure exchanger as defined in claim 1 wherein each piston comprises a small central passageway providing liquid communication from the cylinder primary chamber to the piston drive-rod.

15. The combined axial-piston liquid pump and energy recovery pressure exchanger as defined in claim 1 wherein the piston drive-rods are dimensioned in diameter relative to the cylinder diameter so as to provide a ratio between total cross-sectional area of the primary piston ends and the effective cross-sectional area of the secondary piston ends that is equal to a ratio between a designated primary flow rate and a designated secondary flow rate.

16. The combined axial-piston liquid pump and energy recovery pressure exchanger as defined in claim 1 whereby the pistons are made to perform, at their primary ends, a pumping action that serves to maintain a designated elevated working primary pressure input at the a destination while, at their secondary ends, the pistons are made to perform work in a pressure exchange that enables energy recovered from a secondary liquid flow to contribute to the primary pumping action and thus reduce overall operating costs.

17. An energy-recovering liquid pumping machine combining an axial-piston liquid pump and energy-recovery pressure exchanger comprising:

a rotor-drum comprising a plurality of cylinders arranged in a radial array constituting a set of cylinder bores extending from open ends at a primary end of the rotor-drum to a transverse bulkhead configured in said rotor-drum near a secondary end of the rotor-drum;

a primary end block positioned adjacent the primary end of the rotor-drum and comprising a primary intake port receiving primary liquid and a primary outlet port delivering primary liquid;

a secondary end block positioned adjacent the secondary end of the rotor-drum and comprising a secondary intake port receiving secondary liquid, and a secondary outlet port delivering secondary liquid, wherein said primary and secondary end blocks are mechanically coupled together so as to constitute an end block assembly flanking and supporting said rotor-drum in a manner so that the rotor-drum is rotatable relative to the end block assembly about a concentric axis;

a plurality of pistons, each disposed in a corresponding one of the cylinders in an axially and rotationally slidable manner, each piston having a cylindrical-shaped main portion of designated diameter, closely fitted to form a sliding seal in the corresponding cylinder and thus creating at the primary end a primary cylinder chamber, each piston configured at the secondary end with an extending drive-rod extending through the rotor-drum, thus creating at the secondary end a secondary cylinder chamber;

said primary end block including a primary valve plate comprising primary valve port apertures; and said secondary end block including a secondary valve plate comprising secondary valve port apertures.

18. The combined axial-piston liquid pump and energy recovery pressure exchanger as defined in claim 17 further comprising:

a swash-plate configured with an inclined flat smooth liquid-lubricated sliding surface; and a set of sliders, each associated with a corresponding piston and attached to the corresponding drive-rod in a swivel manner, each slider configured with a flat smooth liquid-lubricated working surface interfacing, urged against and sliding on the flat smooth working surface of said swash-plate so as to reciprocate each piston independently in repeating sequential cycles in response to relative rotation between said rotor-drum and said swash-plate.

19. A method of recovering energy in a single pumping machine that delivers a primary liquid flow at a designated flow rate and at high pressure to a primary destination in a liquid-related process where there is available a secondary flow originating at a designated flow rate and at high pressure, to be disposed of at reduced pressure, comprising the steps of:

providing a hydraulic pump comprising a rotor-drum having a plurality of cylinders in a radial array, each cylinder extending from an open end of the rotor-drum, to a bulkhead of the rotor-drum near a secondary end thereof;

providing in each cylinder, a piston having a main body disposed within a primary working cylinder chamber, the piston having a secondary end configured with an extending drive rod extending through the rotor-drum, the secondary end being disposed in a secondary cylinder chamber;

dimensioning the piston drive-rods to have a diameter such that [effective secondary piston area]/[cylinder cross-sectional area] is made equal to [designated secondary flow rate]/[designated primary flow rate];

providing valve means, in end blocks interfacing both ends of the rotor-drum, made and arranged to alternately provide liquid communication between the primary cylinder chambers and a pair of primary ports, and between the secondary cylinder chambers and a pair of secondary ports; and rotating the rotor-drum while reciprocating the pistons in a manner to perform a pumping action in the primary cylinder chamber to pressurize the primary liquid flow, and to perform pressure-exchange energy recovery from the secondary liquid flow, thus assisting the pumping action and reducing operating cost.

20. The method of method of recovering energy in a single pumping machine as defined in claim 19 wherein:

the primary liquid flow is of seawater;

the primary destination is a seawater intake of a main seawater chamber of a reverse osmosis desalination system;

the secondary liquid flow is of brine from the main seawater chamber of the reverse osmosis desalination system, and the secondary destination is a brine disposal facility, where the brine may be treated or simply discharged as wastewater.

\* \* \* \* \*